(12) United States Patent
Deng et al.

(10) Patent No.: US 11,845,879 B2
(45) Date of Patent: Dec. 19, 2023

(54) RECORDING MATERIAL

(75) Inventors: Lan Deng, Lansdale, PA (US); Brian R. Einsla, Chalfong, PA (US); Chao-Jen Chung, North Wales, PA (US); Thomas William Kermis, Lansdale, PA (US); Rebecca LuAnn Smith, Ambler, PA (US)

(73) Assignee: ROHM AND HAAS COMPANY, Collegeville, PA (US)

( * ) Notice: Subject to any disclaimer, the term of this patent is extended or adjusted under 35 U.S.C. 154(b) by 881 days.

(21) Appl. No.: 12/985,408

(22) Filed: Jan. 6, 2011

(65) Prior Publication Data

US 2011/0172094 A1    Jul. 14, 2011

Related U.S. Application Data

(60) Provisional application No. 61/367,926, filed on Jul. 27, 2010, provisional application No. 61/335,814, filed on Jan. 11, 2010.

(51) Int. Cl.
  *C09D 151/06* (2006.01)
  *C08F 265/06* (2006.01)

(52) U.S. Cl.
  CPC .......... *C09D 151/06* (2013.01); *C08F 265/06* (2013.01)

(58) Field of Classification Search
  CPC .......... Y10T 428/24802; C08F 265/06; C09D 151/06
  USPC .................................................. 503/200, 201
  See application file for complete search history.

(56) References Cited

U.S. PATENT DOCUMENTS

| | | |
|---|---|---|
| 2,519,660 A | 8/1950 | James |
| 3,306,763 A | 2/1967 | Hoge |
| 3,347,675 A | 10/1967 | Henn et al. |
| 3,348,776 A | 10/1967 | Hunter |
| 4,427,835 A | 1/1984 | Bush et al. |
| 4,428,321 A | 1/1984 | Arens |
| 4,468,498 A | 8/1984 | Kowalski et al. |
| 4,469,825 A | 9/1984 | Kowalski et al. |
| 4,480,842 A | 11/1984 | Mahyera et al. |
| 4,594,363 A | 6/1986 | Blankenship et al. |
| 4,920,160 A | 4/1990 | Chip et al. |
| 4,943,612 A * | 7/1990 | Morita ............... C04B 24/26 524/714 |
| 4,985,064 A | 1/1991 | Redlick et al. |
| 5,036,109 A | 7/1991 | Chip et al. |
| 5,041,464 A | 8/1991 | Hoshino et al. |
| 5,157,084 A | 10/1992 | Lee et al. |
| 5,378,534 A | 1/1995 | Kuroanagi et al. |
| 5,409,776 A | 4/1995 | Someya et al. |
| 5,494,971 A | 2/1996 | Blankenship |
| 5,510,422 A | 4/1996 | Blankenship et al. |
| 5,932,515 A | 8/1999 | Rourke |
| 6,043,193 A | 3/2000 | Chen et al. |
| 6,139,961 A * | 10/2000 | Blankenship et al. ........ 428/402 |
| 6,372,819 B1 | 4/2002 | Mizobuchi et al. |
| 6,387,500 B1 * | 5/2002 | Behl ............................. 428/404 |
| 6,632,531 B2 | 10/2003 | Blankenship et al. |
| 6,677,008 B2 | 1/2004 | Chen et al. |
| 6,896,905 B2 | 5/2005 | Blankenship et al. |
| 7,507,453 B2 | 3/2009 | Geddes et al. |
| 7,935,656 B2 | 5/2011 | Elmasry et al. |
| 8,054,323 B2 | 11/2011 | Peters et al. |
| 2001/0023049 A1 | 9/2001 | Yasuda et al. |
| 2002/0001698 A1 * | 1/2002 | Blankenship .......... D21H 19/42 428/32.18 |
| 2004/0180184 A1 * | 9/2004 | Fillion et al. ............... 428/211.1 |
| 2005/0239646 A1 * | 10/2005 | Hada et al. ................... 503/200 |
| 2008/0075869 A1 * | 3/2008 | Nelli ............................. 427/387 |
| 2010/0245524 A1 | 9/2010 | Peters et al. |

FOREIGN PATENT DOCUMENTS

| | | |
|---|---|---|
| EP | 267726 | 5/1888 |
| EP | 331421 | 9/1989 |
| EP | 0512114 A1 | 11/1992 |
| EP | 0915108 | 5/1999 |
| EP | 1318025 A2 | 6/2003 |
| EP | 1403700 A1 | 3/2004 |
| EP | 1911881 A1 | 4/2008 |
| JP | S50132895 | 10/1975 |
| JP | 2080288 A | 3/1990 |
| JP | 1990080288 | 3/1990 |
| JP | 1994305251 | 1/1994 |
| JP | 6092035 A | 4/1994 |
| JP | 6305251 A | 11/1994 |

(Continued)

OTHER PUBLICATIONS

Pavlyuchenko, Sorochinskaya, Ivanchey, Klubin, Kreichman, Budtov, Skrifvars, Halme, Koskinen, Hollow-Particle Latexes: Preparation and Properties;Journal of Polymer Science 2001; pp. 1435-1449; Part A, vol. 39, John Wiley & Sons, Inc.

(Continued)

*Primary Examiner* — Christopher M Polley
*Assistant Examiner* — Sathavaram I Reddy

(57) ABSTRACT

A recording material including a support having at least one colored surface and a layer of polymeric material is described. The layer including polymeric particles has a core/shell structure, and the particles are either (i) particles having an outermost polymer shell having a calculated Tg of from 40° C. to 80° C., or (ii) particles having an inner polymer shell having a calculated Tg of from 40° C. to 130° C. and an outer polymer shell having a calculated Tg of from −55° C. to 50° C. The calculated Tg of said outer polymer shell is lower than that of said inner polymer shell, the particles including, when dry, at least one void capable of providing opacity to said layer, and the colored surface has sufficient color density to be visibly contrasting to a surface of the subsequent layer including the polymeric particles disposed thereon.

13 Claims, No Drawings

(56) References Cited

FOREIGN PATENT DOCUMENTS

| | | |
|---|---|---|
| JP | 8187944 A | 7/1996 |
| JP | 03176961 | 6/2001 |
| JP | 2009226668 A | 10/2009 |

OTHER PUBLICATIONS

Extended European Search Report—dated Apr. 10, 2017.
BPA-Free Thermal Paper Coating Technology Named 2017 ICIS Innovation Award Finalist; Reprint from PCI (Paint & Coatings Industry), Aug. 20, 2017, 2 pages.
Dow Receives 11th US EPA Presidential Green Chemistry Challenge Award; The Dow Chemical Company press release, Jun. 12, 2017, 4 pages.
Presidential Green Chemistry Awards: Learning from the Champions', presentation to GC3 (Green Council & Commerce Council), section entitled, "Breakthrough Sustainable Imaging Technology for Thermal Paper", p. 18-21.
Fink, U. et al., 'Imaging Chemicals and Materials, Electrophotography, Thermal Printing, Photography, Markets and Technology Trends for Printers/Cameras, Consumbables and Specialty Chemicals', SRI Consulting Report, Nov. 2017, pp. 1, 140-141.
Adams, R. L., Phase Change Ink Jet Technology, Recent Progress in Ink-Jet Technologies 1993, 138-141.
"2018 Edison Awards, Winners Announced!"; 2018 Edison Awards, Sealing Technology & Thermal Applications category; 2018; https://edisonawards.com/winners2018.php.
"DOW Receives 2017 R&D 100 Awards from R&D Magazine"; PCI Paint & Coatings Industry; Dec. 1, 2017.
"Three Dow Technologies Win 2017 Sustainability Awards from the Business Intelligence Group"; DOW Press Release; Oct. 12, 2017.

\* cited by examiner

RECORDING MATERIAL

This application claims the benefit of priority under 35 U.S.C. § 119(e) of U.S. Provisional Applications No. 61/367,926 filed Jul. 27, 2010 and No. 61/335,814 filed Jan. 11, 2010.

This invention relates to a recording material. More specifically, this invention relates to a recording material including: a) a support having at least one colored surface; and, disposed thereon, b) a layer including certain polymeric particles having a core/shell structure, the particles including, when dry, at least one void. This invention also relates to a recording material including: a) a support; and, disposed thereon, b) a layer including a permanent colorant and certain polymeric particles having a core/shell structure, the particles including, when dry, at least one void. This invention also relates to a method of providing an image using the recoding materials.

Recording materials such as, for example, recording sheets that are used to provide an image are well-known in the art. The development of an image by exposing selected portions of a recording sheet to energy such as, for example, to heat, pressure, light, ultrasonic radiation, or combinations thereof has been widely practiced. The formation of an image using the recording material of this invention is typically effected through the use of heat, pressure, or combinations thereof.

U.S. Pat. No. 5,378,534 discloses a recording sheet formed by coating colored sheets with an opacifying compound prepared by mixing an aqueous suspension of polymer particles embodying internal voids dispersed with a water base coating material.

U.S. Pat. No. 5,932,515 discloses recording sheets incorporating developer, color precursor, and hollow microspherical plastic pigment.

Improvements in the performance of recording materials are still sought. The present invention provides simplicity of formulations and versatility in the methods and types of images that can be formed without the frequently expensive methods based on the reaction of color precursors and developer, which are inherently subject to long term instability.

In a first aspect of the present invention there is provided a recording material comprising: a) a support comprising at least one colored surface; and, disposed thereon, b) a layer comprising polymeric particles having a core/shell structure, said particles selected from the group consisting of: (i) particles having an outer polymer shell having a calculated Tg of from 40° C. to 80° C. and (ii) particles having an inner polymer shell having a calculated Tg of from 40° C. to 130° C. and an outer polymer shell having a calculated Tg of from −55° C. to 50° C.; wherein the calculated Tg of said outer polymer shell is lower that of said inner polymer shell; said particles comprising, when dry, at least one void.

In a second aspect of the present invention there is provided a recording material comprising: a) a support comprising at least one colored surface having a surface roughness of less than 3.0 microns; and, disposed thereon, b) a layer comprising polymeric particles having a core/shell structure, said particles having an outer first polymer shell having a calculated Tg of from 40° C. to 130° C., and said particles comprising, when dry, at least one void.

In a third aspect of the present invention there is provided a recording material comprising: a) a support; and, disposed thereon, b) a layer comprising a permanent colorant and polymeric particles having a core/shell structure, said particles having an outer first polymer shell having a calculated Tg of from 40° C. to 130° C. and said particles comprising, when dry, at least one void.

In a fourth aspect of the present invention there is provided a method for providing an image comprising: forming the recording material of the first, second, or third aspects of the present invention; and subjecting selected portions of said recording material to an agent selected from the group consisting of heat, pressure, and combinations thereof, sufficient to reduce the opacity of said selected portions.

The recording material of the present invention includes a support. Typically, the support will be in the form of a sheet-like structure such as, for example, paper, synthetic paper, board, plastic film such as vinyl or polyester, leather, wood veneer, metal, and nonwoven sheet. In certain aspects of this invention the support has at least one colored surface, although both sides may be colored. By "colored surface" herein is meant that the surface has sufficient color density to be visibly contrasting to the surface of the subsequent layer disposed thereon; The color may be imparted, for example, by pigments, dyes, or the intrinsic color of the support and the support may be impregnated with colorant or coated with a colored coating to provide a colored surface. The colored surface may be uniform or varied in color density or may be patterned as desired.

The recording material of this invention includes a layer that includes certain polymeric particles having a core/shell structure, the particles including, when dry, at least one void. Various of the polymeric particles that have a core/shell structure, the particles including, when dry, one or more voids include ROPAQUE™ opaque polymer and hollow and vesiculated polymer particles, as disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; 5,510,422; 5,494,971; 5,510,422; 6,139,961; 6,632,531; and 6,896,905; European Patent Applications EP 267,726, EP 331,421 and EP 915,108; and Journal of Polymer Science—Part A, volume 39, pages 1435-1449 (2001), published by John Wiley and Sons, Inc. The polymer particles may be made by emulsion polymerization.

The core of the core-shell polymeric particle includes, when dry, at least one void capable of scattering visible light, i.e., capable of providing opacity to a composition in which it is included. Core-shell particles including, when dry, one or more void have been disclosed in which the void was generated, for example, by complete or partial hydrolysis and dissolution of the core polymer, by swelling of the core polymer with acid, base or nonionic organic agents with restricted subsequent collapse of the particle, and the like. In a preferred embodiment the core-shell particle is formed by an aqueous multistage emulsion polymerization followed by swelling with a base.

The stages of the multistage polymers employed in the present invention include core stage polymer, a first shell stage polymer and, in some instances, a second shell stage polymer. The core and shells may each, independently, include more than one stage. There may also be one or more intermediate stages. An intermediate stage polymer, when present, partially or fully encapsulates the core and itself is partially or fully encapsulated by the first shell. The intermediate stage, referred to as a "tiecoat" herein, may be prepared by conducting an emulsion polymerization in the presence of the core. The first shell polymer partially or fully encapsulates the core polymer and, if present, the tiecoat polymer. In some embodiments the first shell polymer may be the outer shell. The outer second shell polymer, if present, partially or fully encapsulates the first shell. By "partially encapsulates" herein is meant that at least 50% of the surface area is covered with the subsequent polymer.

The polymeric particles may be polymerized using a variety of ethylenically unsaturated monomers as described in the above references. Examples of nonionic monoethylenically unsaturated monomers include styrene, vinyltoluene, ethylene, vinyl acetate, vinyl chloride, vinylidene chloride, acrylonitrile, (meth)acrylamide, various ($C_1$-$C_{20}$) alkyl or ($C_3$-$C_{20}$) alkenyl esters of (meth)acrylic acid, including methyl acrylate (MA), methyl methacrylate (MMA), ethyl (meth)acrylate, butyl (meth)acrylate, 2-hydroxyethyl(meth) acrylate, 2-ethylhexyl(meth)acrylate, benzyl (meth)acrylate, lauryl(meth)acrylate, oleyl(meth)acrylate, palmityl(meth) acrylate, and stearyl(meth)acrylate. The expression (meth) acrylic acid includes both acrylic acid and methacrylic acid. The use of the term "(meth)" followed by another term such as (meth)acrylate or (meth)acrylamide, as used throughout the disclosure, refers to both acrylates or acrylamides and methacrylates and methacrylamides, respectively. Typically acrylic esters such as MMA, EA, BA and styrene are preferred monomers to polymerize and form the shell of the polymeric particles. Difunctional vinyl monomers, such as divinyl benzene, allyl methacrylate, ethylene glycol dimethacrylate, 1,3-butane-diol dimethacrylate, diethylene glycol dimethacrylate, trimethylol propane trimethacrylate, and the like, may also be copolymerized to form a crosslinked outer shell such as are taught in US Patent Application Publication No. 2003-0176535 A1.

The calculated glass transition temperature ("Tg") of the various shells of the polymeric particles is achieved by selection of the monomers and amounts of the monomers to achieve the desired polymer Tg as is well known in the art. Tgs of the polymers are calculated herein by using the Fox equation (T. G. Fox, Bull. Am. Physics Soc., Volume 1, Issue No. 3, page 123 (1956)). that is, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers. In embodiments where two or more different polymeric particles are used then the calculated Tg of a particular shell, for example, shall be calculated based on the overall composition of the shell polymers.

In one aspect the present invention relates to a recording material including a layer including a core/shell polymeric particle that includes a core, a first shell, and a second shell: the core including, when dry, at least one void; the first shell polymer having a calculated glass transition temperature (Tg) of from 40° C. to 130° C.; and the second shell polymer having a Tg of from −55° C. to 50° C.; wherein the calculated Tg of said outer polymer shell is lower that of said inner polymer shell; and wherein the weight ratio of the second shell polymer to the total of all other structures of the polymeric particle is from 0.15:1 to 3:1. The second shell polymer has a composition different from that of the first shell polymer. The first and second shell may be based on multiple stages, compositions, and be based on asymmetric monomer additions; the calculated Tg of the second shell is calculated based on the sum of all polymer formed after the first shell polymer is formed. By the "total of all other structures of the polymeric particle" herein is meant the total of optional seed polymer, the core polymer, the optional tie coat, and the first stage polymer, each optionally including a multiplicity of stages or compositions.

The polymeric particles having a core/shell structure used in this invention typically have an outer diameter of from 200 nm to 1500 nm, preferably from 250 nm to 1000 nm, and an inner (void) diameter of from 150 nm to 1000 nm, preferably from 200 nm to 800 nm. Recording materials of the present invention may include a blend of two or more hollow microsphere polymers having different cavity sizes.

The layer of the recording material of this invention that includes the polymeric particles having a core/shell structure may optionally include a polymeric binder. By "polymeric binder" herein is meant a polymer expressly excluding core/shell polymer particles including, when dry, a void. The polymeric binder may include particulate polymers such as, for example, emulsion polymers and soluble polymers such as are commonly known as resins. The polymeric binder may be present in an amount of from 0% to 40%, preferably from 0% to 30%, by weight based on the dry weight of the polymeric binder and the polymeric core/shell particles including, when dry, a void. In some embodiments the polymeric binder includes a polymeric emulsion polymer binder. When the calculated Tg of the outer shell of the polymer particles having a core/shell structure is less than 50° C., it may not be necessary to use a polymeric binder, although it is possible to use a coalescent or plasticizer to facilitate film integrity.

The polymeric emulsion polymer binder used in this invention includes at least one copolymerized ethylenically unsaturated monomer such as, for example, a (meth)acrylic ester monomer including methyl(meth)acrylate, ethyl(meth) acrylate, butyl(meth)acrylate, 2-ethylhexyl(meth)acrylate, decyl(meth)acrylate, hydroxyethyl (meth)acrylate, hydroxypropyl(meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and crosslinkable monomers such as N-alkylol (meth)acrylamides. In certain embodiments the emulsion polymer includes less than 3 wt. %, preferably less than 0.1 wt. %, based on the weight of the polymer, of a copolymerized multi-ethylenically unsaturated monomer. Multi-ethylenically unsaturated monomers include, for example, allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene. The polymeric emulsion polymer binder may include a copolymerized monoethylenically-unsaturated acid monomer. Acid monomers include, for example, (meth)acrylic acid, crotonic acid, itaconic acid, fumaric acid, maleic acid, monomethyl itaconate, monomethyl fumarate, monobutyl fumarate, and maleic anhydride, phosphoethyl methacrylate, and sufoethyl methacrylate.

The emulsion polymerization techniques used to prepare the polymeric emulsion polymer binder are well known in the art such as, for example, as disclosed in U.S. Pat. Nos.

4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers. The monomer mixture may be added neat or as an emulsion in water. The monomer mixture may be added in a single addition or in multiple additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed. In another embodiment of the present invention the polymeric emulsion polymer binder may be prepared by a multistage emulsion polymerization process, in which at least two stages differing in composition and Tg are polymerized in sequential fashion, but that expressly do not include, when dry, a void. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. Each of the stages of the multi-staged emulsion polymer may contain the same monomers, surfactants, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

The calculated glass transition temperature ("Tg") of the emulsion polymer binder is typically from −65° C. to 105° C., or in the alternative, from −25° C. to 35° C. The average particle diameter of the emulsion polymer binder particles is typically from 1 nm to 500 nm, preferably from 10 nm to 400 nm, and more preferably from 15 nm to 250 nm.

The polymeric binder be or may include resin(s) other than emulsion polymers, including, for example, thermoplastic and crosslinkable resins. Useful resin components include, for example, polyvinyl alcohol, protein such as, for example, casein, starch, gelatin, copolymers of acrylic acid esters or methacrylic acid esters, copolymers of styrene and acrylic or methacrylic acid esters, copolymers of styrene and acrylic acid, styrene-butadiene copolymers, copolymers of vinyl acetate with other acrylic or methacrylic acid esters, and the like.

The layer(s) of the present invention may be formulated in an aqueous medium, i.e., a medium including primarily water, by blending in a conventional low shear mixing apparatus. Other well known mixing techniques may be employed to prepare the layers of the present invention. Additives may be incorporated into the layer formulations to confer certain performance properties. The layer formulation may contain, in addition to the core/shell emulsion polymer and optional pigment(s) such as for example, calcium carbonate and silica, adjuvants such as, for example, emulsifiers, surfactants, lubricants, coalescing agents, plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellents, and anti-oxidants. Typical bases that may be incorporated in layer formulations of the present invention include ammonia; fixed bases such as NaOH, KOH, and LiOH; amines such as diethanol amine, triethanolamine and any other known base to control pH. The layer is applied to the support by conventional coating means known in the art and dried, typically with the minimum heat for the minimum time to enable facile handling of the recording material, whether in separate sheet or in roll form, while avoiding premature collapse of the voids in the core/shell polymeric particles.

In the second aspect of this invention a support including at least one colored surface having a surface roughness of less than 3.0, alternatively from 0.5 to 3.0, alternatively from 0.5 to 2.5, microns as measured by a Parker print surf roughness tester is employed. The smoothness of this surface is important in effecting high print quality.

Other factors affecting the printed image quality include the hardness and the porosity of the support. Both properties can affect effective contact between the support and a thermal head, which in turn affects the pressure the support experiences during thermal printing, and the heat conduction between the support and the thermal head. The hardness of the support can be evaluated by Handle-O-Meter (Thwing-Albert Instrument Company) which measures the combined effects of flexibility and surface friction of sheet materials. Other methods to measure the stiffness/hardness of the support can also be used such as those described in TAPPI test methods T-535 and T543. The porosity of the substrate herein was evaluated by Parker print surf roughness tester using the "porosity" mode.

For example, with similar surface roughness and porosity, a stiff vinyl support (Hand-O-Meter value 141.3) has much higher dynamic printing sensitivity than a soft paper support (Hand-O-meter value 61.6). It is envisioned that the hardness of the underlying black coating can affect the dynamic printing sensitivity too. For example, if the colored coating layer contains very soft binders or hollow polymer spheres which can deform under the printing condition, then the image quality will be worse compared to a colored coating layer containing relatively hard binders or pigments.

The porosity effect can be observed comparing synthetic paper (YUPO) and regular copy paper (Boise ASPEN™ 30). With similar surface roughness (3.0 micron) and lower hand-O-meter value (410), the non-porous synthetic paper (Parker surf porosity value 15.24 mL/min) shows much higher dynamic printing sensitivity compared to the Boise ASPEN™ 30 copy paper (Parker surf porosity value 155.5 mL/min). Substrates with both low roughness (0.9 microns, e.g.) and low porosity values (5.0 mL/min., e.g.) such as Mylar™ polyester sheet give superior printing.

In one embodiment of this invention a dual-color recording material is provided including (a) dark colorant layer (b) a layer including core/shell polymeric particles including, when dry, a void and a light colorant with an optional binder layer on top; and (c) an optional layer of core/shell polymeric particles including, when dry, a void (and optional binder) on top. The dual-color recording material is white with the optional layer (c) on top. It is colored without the optional layer (c). The dual-color recording material is heat and/or pressure sensitive. Upon applying low heat or pressure, it shows vivid color of the top colorant. Upon applying higher heat or pressure, it shows vivid color of the bottom colorant In the third aspect of this invention a support, that may or may not be colored, has disposed thereon a layer including certain core/shell particles and a permanent colorant. By "permanent colorant" is meant herein a colorant such as, for example one or more dyes, pigments or mixtures thereof that produce a visible color that is substantially invariant during the application or drying of the layer, storage, and formation of an image using the recording material. Expressly excluded as permanent colorants are any material amounts of color precursors such as leuco dyes, for example, and developers such as bisphenol A and bisphenol S, for example, which form colorants during the application or drying of the layer, storage, or formation of an image using the recording material. Preferably the layer is substantially free from color precursors and developers. Typically less than 5%, preferably less than 1%, and more preferably less than 0.1%, total colorant precursors and developers, by weight based on the total weight of colorant in the layer are included. Alternatively, a recording material is contemplated including a support, that may or may not be colored, that has disposed thereon a layer including certain core/shell particles and a permanent colorant; and, additionally, an optional layer of core/shell polymeric particles including, when dry, a void (and optional binder) on top.

In the method of this invention the recording material of one of the aspects of the invention is formed and selected portions of the recording material are subjected to heat, pressure, or combinations thereof such as are effected by direct thermal printing, for example. "Pressure" herein is understood to include methods that may cause removal of some or all of the layer including the core/shell polymeric particles by, for example, erosion or scraping, as well as pressure applied substantially normal to the substrate.

The invention in some of its embodiments will now be further described by reference to the following examples:

Preparation of Polymeric Particles Having a Core/Shell Structure.

Samples 1-2 and 4-9 were prepared according to the teachings of Example 17 of U.S. Pat. No. 6,252,004.

Samples 1-2 had an inner shell having a calculated Tg of 101° C. and an outer shell having a calculated Tg of 59.5° C. The calculated Tg of the combined shells was 77.1° C.

Samples 4-6 have an outer shell (single shell) having a calculated Tg of 101° C.

Sample 7 has an outer shell (single shell) having a calculated Tg of 54.9° C.

Sample 8 had an inner shell having a calculated Tg of 78.4° C. and an outer shell having a calculated Tg of 38.8° C. The calculated Tg of the combined shells was 54.9° C.

Sample 9 had an inner shell having a calculated Tg of 86.5° C. and an outer shell having a calculated Tg of 49.5° C. The calculated Tg of the combined shells was 61.7° C.

Sample 3 was prepared according to the teachings of Example 1 of U.S. Pat. No. 6,139,961. It has an inner shell having a calculated Tg of 100° C. and an outer shell of −33° C.

Equipment:
A4 cellulosic copy paper (ASPEN™ 30) and YUPO synthetic paper as base substrate (support).
HP Color Laser jet 4600 PS for printing the ink layer of various colors.
18 and #22 WWR for hand drawdowns.
Zebra Xillplus thermal printer for thermal printing tests.
Brightness meter: Model S4-M from Technidyne Corp.

Surface Roughness Measurement:

The roughness of the support sheets was measured by a Parker print surface roughness tester (Model No. M590, Messmer Instruments Ltd.) using TAPPI official test Method T555. This method measures the air flow between the test surface and a metal band in contact with it. The rate of the air flow is related to the surface smoothness of the paper. An average of five measurements was recorded as the roughness of the specimen.

EXAMPLE 1

Preparation and Evaluation of Recording Material (Chemicals from Nissho Kogyo unless otherwise noted)

Formulation A:
To a 250 ml plastic jar, were added 24.64 g water, 2.00 g CaCO3, 2.00 g silica, and one drop of dispersing reagent. The mixture was stirred for 5 min. Then 40.0 g 10% PVA solution was added to the mixture while stirring, followed by 36.36 g Sample 1 (27.5% solids), and 5.0 g EUDERM™ Green (40.0%, Bayer). Finally, 2.00 g of lubricant and 1 drop of defoamer was added.

Formulation B:
To a 250 ml plastic jar, were added 53.20 g water, 1.00 g CaCO3, 1.00 g silica, and one drop of dispersing reagent. The mixture was stirred for 5 min. Then 8.00 g 50.0% RHOPLEX™ P-308 emulsion (product of The Dow Chemical Co.) was added to the mixture while stirring, followed by 46.82 g Sample 2 (29.9% solids). The mixture was neutralized to pH=8.60 with 15% NaOH, and viscosity=486 cps (20 rpm, spindle 63) with RHOPLEX™ RM-232D (product of The Dow Chemical Co.). Finally, 6.00 g of lubricant and 1 drop of defoamer was added.

The above two formulations were used in the hand draw-downs below.

EXAMPLE 1A

On a 75 g/m² A4 paper was printed a black ink layer with ink density of 5-10 g/m² A layer containing 20% of polymeric binder and 80% Sample 2 was coated on top (Formulation B), the coat weight was 7-10 g/m², with higher coat weight providing better hiding for the underlying black layer. Before printing, the layer was opaque, it provided hiding for the underlying black layer, and the whole substrate appeared white. During printing, the polymeric particles including a void are believed to have collapsed at the area where the heat and pressure was applied by the thermal head, the collapsed portions of the layer became transparent, showing the underlying black color where it was printed.

EXAMPLE 1B

On a 75 $g/m^2$ A4 paper was printed a blue ink layer with ink density of 5-10 $g/m^2$ A layer containing 20% of polymeric binder and 80% Sample 2 was coated on top (Formulation B), the coat weight was 7-10 $g/m^2$, with higher coat weight providing better hiding for the underlying blue layer. Before printing, the layer was opaque, it provided hiding for the underlying blue layer, and the whole substrate appeared white. During printing, the polymeric particles including a void are believed to have collapsed at the area where the heat and pressure were applied by the thermal head; the collapsed portions of the layer became transparent, showing the underlying blue color where it was printed.

EXAMPLE 1C

On a 75 $g/m^2$ A4 paper was printed a green ink layer with ink density of 5-10 $g/m^2$ A layer containing 20% of polymeric binder and 80% Sample 2 was coated on top (Formulation B), the coat weight was 7-10 $g/m^2$, with higher coat weight providing better hiding for the underlying green layer. Before printing, the layer was opaque, it provided hiding for the underlying green layer, and the whole substrate appeared white. During printing, the polymeric particles including a void are believed to have collapsed at the area where the heat and pressure were applied by the thermal head; the collapsed portions of the layer became transparent, showing the underlying green color where it was printed.

EXAMPLE 2

Preparation and Evaluation of Recording Material

On a 75 $g/m^2$ A4 paper was coated a collapsible layer containing 5-10% green dye, 70-75% Sample 1 and 20% binder. (Formulation A) The coat weight was 5-10 $g/m^2$. Before printing, the substrate showed a green tint, which is a believed to be a combination of the white color from the polymeric particles including a void and the green color from the dye. During printing, the polymeric particles including a void are believed to have collapsed at the area where the heat and pressure was applied by the thermal head and became transparent, the substrate showed vivid green color from the green dye where it was printed.

Depending upon how the printing area was set, two effects were achieved: Dark image on a light background or light image on a dark background. The same concept can be used to print any colors with a tint difference from the background.

EXAMPLE 3

Preparation and Evaluation of Recording Material

EXAMPLE 3A

On a 75 $g/m^2$ A4 paper was printed a black ink layer with ink density of 5-10 $g/m^2$ A collapsible layer containing about 5-10% green dye, 70-75% Sample 1 and 20% polymeric binder was coated on top (Formulation A). The coat weight was 5-10 $g/m^2$, with higher coater weight providing better hiding for the underlying black layer. Before printing, the substrate showed a green tint, which is believed to be a combination of the white color from the polymeric particles including a void and the green color from the dye. During the first pass of printing at a lower temperature, the top layer partially collapsed at the area where the heat and pressure were applied by the thermal head, the partially collapsed layer still provided enough hiding for the underlying black, and the substrate showed vivid green color where it was printed. During the second pass of printing at a higher temperature, the top layer completely collapsed at the area where the heat and pressure was applied by the thermal head, the collapsed layer couldn't provide enough hiding for the underlying black layer, the substrate showed black where it was printed, which was due to the hiding of green color by black color.

The same concept can be used to print any dark colored foreground text on any light colored background logo, brand images etc., not limited to the color choices shown here.

EXAMPLE 3B

On a 75 $g/m^2$ A4 paper was printed a yellow ink layer with ink density of 5-10 $g/m^2$ A layer containing about 5-10% green dye, 70-75% Sample 1 and 20% polymeric binder was coated on top (Formulation A). The coat weight was 5-10 $g/m^2$, with higher coat weight providing better hiding for the underlying yellow layer. Before printing, the substrate showed a green tint, which is believed to be a combination of the white color from the polymeric particles including a void and the green color from the dye.

During the first pass of printing at a lower temperature, the top layer partially collapsed at the area where the heat and pressure was applied by the thermal head, the partially collapsed layer still provided enough hiding for the underlying black, and the substrate showed vivid green color where it was printed. During the second pass of printing at a higher temperature, the top layer completely collapsed at the area where the heat and pressure was applied by the thermal head, the collapsed layer couldn't provide enough hiding for the underlying yellow layer, the substrate showed yellowish green where it was printed, which was due to the combination of green color and yellow color.

EXAMPLE 4

Preparation and Evaluation of Recording Material

EXAMPLE 4A

On a 75 $g/m^2$ A4 YUPO synthetic paper was printed a black ink layer with ink density of 5-10 $g/m^2$. A layer containing 20% of polymeric binder and 80% Sample 2 was coated on top (Formulation B), the coat weight was 7-10 $g/m^2$, with higher coat weight providing better hiding for the underlying black layer. Before printing, the layer was opaque, it provided hiding for the underlying black layer, and the whole substrate appeared white. During printing, the polymeric particles including a void are believed to have collapsed at the area where the heat and pressure were applied by the thermal head; the portions of layer became transparent, showing the underlying grey scale image and barcode where it was printed.

EXAMPLE 4B

On a 75 $g/m^2$ A4 paper was printed a black ink layer with ink density of 5-10 $g/m^2$ A collapsible layer containing about 20% of polymeric binder and 80% polymeric particles including a void was coated on top (Formulation B), the coat weight was 7-10 g/m², with higher coat weight providing better hiding for the underlying black layer. Before printing, the layer was opaque, it provided hiding for the underlying black layer, and the whole substrate appeared white. During printing, the polymeric particles including a void are believed to have collapsed at the area where the heat and pressure were applied by the thermal head; the layer became transparent, showing the underlying grey scale image and barcode where it was printed. Print quality was dependent on the surface smoothness of the substrate. Synthetic paper offered better image quality than porous cellulose paper.

EXAMPLE 5

Preparation and Evaluation of Recording Material

On a 75 g/m² A4 paper is printed a black ink first layer with ink density of 5-10 g/m². A layer containing 5-10% green dye, 70-75% Sample 1 and 20% polymeric binder is coated as a second layer (Formulation A). The coat weight is 5-10 g/m². A third layer containing about 20% of polymeric binder and 80% Sample 1 is coated on top (formulation B), the coat weight is in the range of 3-7 g/m². Before printing, the top layer is opaque, it provides hiding for the underlying layers, and the whole substrate appears white. During the first pass of printing at a lower temperature, the polymeric particles including a void in the top (third) layer collapse at the area where the heat and pressure is applied by the thermal head, the substrate shows a green color (the color of the middle (second) layer) where it is printed. During the second pass of printing at a higher temperature, the polymeric particles including a void in the middle layer are believed to collapse at the area where the heat and pressure are applied by the thermal head, the collapsed layer cannot provide enough hiding for the underlying black layer, the substrate shows black where it was printed, which is due to the hiding of green color by black color.

EXAMPLE 6

Preparation and Evaluation of Recording Material

On a 75 g/m² A4 paper was printed a black ink layer with ink density of 5-10 g/m² A collapsible layer containing 20% of polymeric binder and 80% Sample 2 was coated on top (Formulation B), the coat weight was in the range of 7-10 g/m², with higher coat weight providing better hiding for the underlying black layer. Before pressure was applied, the layer was opaque, it provided hiding for the underlying black layer, and the whole substrate appeared white. After the pressure was applied, the polymeric particles including a void are believed to have collapsed and became transparent, showing the underlying black color at the area where pressure was applied.

The above mentioned recording material can be used as a pressure-sensitive recording material to replace carbon/carbonless paper.

EXAMPLE 7

Preparation and Evaluation of Recording Material

Formulations A, B, and C were prepared as described in Table 7.1

TABLE 7.1

Preparation of compositions including polymeric core/shell particles

| Formulation | CaCO3 | Silica | UCD 1507E | Sample 2 | RHOPLEX™ P-308 | Lubricant | Water | NaOH (15%) drops | RHOPLEX™ RM-232D drops | PH | Viscosity cps @ 20 rpm |
|---|---|---|---|---|---|---|---|---|---|---|---|
| Solids | 100.0% | 100.0% | 47.0% | 29.9% | 50.0% | 36.0% | | | | | |
| A (wt.) | | | 31.91 | 83.61 | | | 84.47 | 12 | 9 | 8.00 | 522 |
| Ratio: | | | 0.375 | 0.625 | | | | | | | |
| B (wt.) | 2.00 | 2.00 | | 86.96 | 16.00 | 5.56 | 87.49 | 11 | 12 | 8.50 | 468 |
| Ratio: | 0.05 | 0.05 | | 0.65 | 0.20 | 0.05 | | | | | |
| C (wt.) | | | | 93.65 | 20.00 | 5.56 | 80.80 | 5 | 9 | 8.50 | 528 |
| Ratio: | | | | 0.70 | 0.25 | 0.05 | | | | | |

Formulation A (black dispersion) was drawndown on A4 copy paper using a #16 WWR and dried at 80° C. for 90 seconds. After drying, the coat weight of the black layer was determined to be 8-9 g/m². The coating exhibited an optical density of 1.34 and surface roughness of 3.12 microns. The coated black paper was calendered to different surface roughnesses; after calendaring the optical density of the black surface was 1.4-1.5.

Formulations B and C were drawndown on the calendered black ink surface using #18 and #22 WWR and dried at 80° C. for 90 seconds. The coat weights for Formulations B and C were 8.5 g/sqm. The optical density decreased to 0.15-0.18 after coating the opaque layer. The recording material sheets were printed at a printing speed of 2 in/sec. at printer settings of from 5 to 30, higher values corresponding to higher temperatures of the thermal head. The results are presented in Table 7.2.

TABLE 7.2

Printing Results at various black surface roughness values

| Formulation: | C | C | C | B | B |
|---|---|---|---|---|---|
| Roughness (microns) | 2.5 | 1.5 | 2.0 | 1.5 | 2.0 |
| Printer setting* | Optical Density | | | | |
| 5 | 0.25 | 0.26 | 0.29 | 0.24 | 0.27 |
| 10 | 0.32 | 0.55 | 0.48 | 0.32 | 0.46 |
| 15 | 0.55 | 0.68 | 0.63 | 0.68 | 0.59 |
| 20 | 0.65 | 1.11 | 1.04 | 0.92 | 0.73 |
| 25 | 0.78 | 1.25 | 1.08 | 1.01 | 0.81 |
| 30 | 1.02 | 1.22 | 1.19 | 1.01 | 0.89 |

Prints on recording sheets of Formulation A on the uncalendered black surface support were of unacceptably low quality. Acceptable printing results were found for printing over a wide range of printing conditions on a support having a colored surface having a surface roughness of from 1.5 to 2.5 microns.

EXAMPLE 8

Preparation and Evaluation of Recording Material

Formulations A, B, and C were prepared as described in Table 8.1 and brought to pH=8.5 with the addition of NaOH. The viscosities of the formulations were adjusted using RHOPLEX™ RM-232D.

TABLE 8.1

Preparation of compositions including polymeric core/shell particles

| Formulation | Sample 3 | Sample 2 | RHOPLEX™ P-308 | Lubricant | Water | PH | Viscosity cps @ 20 rpm |
|---|---|---|---|---|---|---|---|
| Solids | 29.9% | | 50.0% | 36.0% | | | |
| A | 127.09 | | | 5.56 | 67.35 | 8.50 | 476 |
| Ratio: | 0.95 | | | 0.05 | | | |
| B | 93.65 | | 20.00 | 5.56 | 80.80 | 8.50 | 432 |
| Ratio: | 0.70 | | 0.25 | 0.05 | | | |
| C | | 93.65 | 20.00 | 5.56 | 80.80 | 8.50 | 495 |
| Ratio: | | 0.70 | 0.25 | 0.05 | | | |

A black ink layer was prepared according to the procedure of Example 7 and calendered to a surface roughness of 1.5 microns (Parker surface roughness). Formulations A, B, and C were drawndown on the calendered black ink surface using #16 and #18 WWR and dried at 80° C. for 90 seconds. The optical densities of the films before (printer setting at 0) and after printing (printer setting at 5-30) are shown below. The coat weights for Formulations A, B, and C are given below. The recording material sheets were printed at a printing speed of 2 in/sec. at printer settings of from 5 to 30, higher values corresponding to higher temperatures of the thermal head. The results are presented in Table 8.2.

TABLE 8.2

Printing results

| Formulation: | A | A | B | C |
|---|---|---|---|---|
| Coat Wt. g/sqm | 6.1 | 8.0 | 8.1 | 7.9 |

| Printer setting | Optical Density | | | |
|---|---|---|---|---|
| 0 | 0.20 | 0.14 | 0.18 | 0.19 |
| 5 | 0.29 | 0.19 | 0.24 | 0.26 |
| 10 | 0.44 | 0.29 | 0.33 | 0.55 |
| 15 | 0.72 | 0.47 | 0.53 | 0.68 |
| 20 | 0.93 | 0.61 | 0.66 | 1.11 |
| 25 | 1.03 | 0.87 | 0.79 | 1.25 |
| 30 | 1.21 | 0.92 | 0.72 | 1.22 |

At the same coat weight a recording sheet of this invention including a layer of Formulation A exhibits better hiding of the underlying black layer, observed as lower optical density before printing. A recording sheet of this invention including a layer of Formulation A including polymeric particles having an inner shell and an outer shell desirably exhibits comparable dynamic printing sensitivity at substantially lower coat weight when compared to Formulation C.

EXAMPLE 9

Preparation and Evaluation of Recording Material

Formulations A-D were prepared as described in Table 9.1

TABLE 9.1

Preparation of compositions including core/shell particles

| | Polymeric core/shell particle | | | | |
|---|---|---|---|---|---|
| | Sample 4 | Sample 5 | Sample 6 | Sample 1 | P-308 |
| Solids: | 19.1% | 27.0% | 18.8% | 27.5% | 50.0% |

| Formulation | | Water | NaOH(15%) drops | RM-232D drops | PH | Viscosity cps @ 20 rpm |
|---|---|---|---|---|---|---|
| A | Sample 4 175.92 | P-308 16.80 | 7.28 | 8 | 6 | 8.48 | 450 |
| B | Sample 5 124.44 | P-308 16.80 | 58.76 | 4 | 5 | 8.30 | 528 |
| C | Sample 6 178.72 | P-308 16.80 | 4.48 | 22 | 7 | 8.19 | 444 |
| D | Sample 1 122.18 | P-308 16.80 | 61.02 | 9 | 11 | 8.22 | 534 |

Note:
P-308 in Table 9.1 is RHOPLEX P-308 (product of The Dow Chemical Company)

Formulations A-D were drawndown on a black vinyl surface having a Parker surface roughness of 2.99 microns using a #18 WWR and dried at 81° C. for 90 seconds. Then a topcoat of PVA (36%), lubricant (5%), silica (4%), calcium carbonate (4%), water (51%) with <0.01% defoamer was applied. The recording material sheets were printed at a printing speed of 2 in/sec. at printer settings of from 5 to 30, higher values corresponding to higher temperatures of the thermal head. The optical densities of the films after printing (printer setting at 30) are shown below. The results are presented in Table 9.2.

TABLE 9.2

Printing results

| | Formulation | | | |
|---|---|---|---|---|
| | A | B | C | D |
| Optical Density | 0.84 | 1.16 | 0.86 | 1.44 |

A recording sheet of this invention including a layer of Formulation D including a core/shell particle having a calculated Tg of 67° C. exhibits superior printing performance to recording sheets including layers of Formulations A-C including core/shell particles having a calculated Tg of 101° C.

EXAMPLE 10

Preparation and Evaluation of Recording Material

Formulations A and B were prepared as described in Table 10.1 and brought to pH=8.5 with the addition of NaOH. The viscosities of the formulations were adjusted to 500 cps using RHOPLEX™ RM-232D.

TABLE 10.I

Preparation of compositions including polymeric core/shell particles

| Formulation | Sample 7 | Sample 8 | RHOPLEX™ P-308 | Lubricant | Water |
|---|---|---|---|---|---|
| Solids | 25.5% | | 50.0% | 36.0% | |
| A | 117.65 | | 20.0 | 5.56 | 56.8 |
| Ratio: | 0.75 | | 0.25 | 0.05 | |
| B | | 119.05 | 20.00 | 5.56 | 55.4 |
| Ratio: | | 0.75 | 0.25 | 0.05 | |

A black ink layer was prepared according to the procedure of example 7 and calendered to a surface roughness of 1.5 microns (Parker surface roughness). Formulations A and B, were drawndown on the calendered black ink surface using a #18 WWR and dried at 80° C. for 90 seconds. The optical densities of the films before (printer setting at 0) and after printing (printer setting at 5-25) are shown below. The recording material sheets were printed at a printing speed of 2 in/sec. at printer settings of from 0 to 25, higher values corresponding to higher temperatures of the thermal head. The results are presented in Table 10.2

TABLE 10.2

Printing results

| | Formulation: | |
|---|---|---|
| | A | B |
| Printer setting | Optical Density | |
| 0 | 0.21 | 0.18 |
| 5 | 0.33 | 0.35 |
| 10 | 0.56 | 0.62 |
| 15 | 0.91 | 1.06 |
| 20 | 1.27 | 1.35 |
| 25 | 1.39 | 1.40 |
| Brightness | 67.0 | 75.0 |

Samples 7 and 8 have the same calculated Tg (54.9° C.) for the total shell composition. Formulation B included sample 8 that had an inner shell having a calculated Tg of 78.4° C.

and an outer shell having a calculated Tg of 38.8° C. Formulation A included sample 7 that had an outer shell (single shell) having a calculated Tg of 54.9° C. The recoding material of the present invention of Formulation B demonstrated superior brightness and printing results in the critical printer setting range of 10 to 20 relative to Formulation B.

EXAMPLE 11

Preparation and Evaluation of Recording Material

Formulations A and B were prepared as described in Table 11.1 and brought to pH=8.5 with the addition of NaOH. The viscosities of the formulations were adjusted to 500 cps using RHOPLEX™ RM-232D.

TABLE 11.1

Preparation of base coat compositions including polymeric core/shell particles

| Formulation | UCD 1507E | Sample 2 | RHOPLEX™ P-308 | Water |
|---|---|---|---|---|
| Solids | 47.0% | 29.9% | 50.0% | |
| A | 44.68 | 117.06 | | 38.26 |
| Ratio: | 0.375 | 0.625 | | |
| B | 44.68 | | 70.00 | 85.32 |
| Ratio: | 0.375 | | 0.625 | |

Formulations A and B were drawndown on A4 copy paper using a #16 WWR and dried at 50° C. for 3 minutes. The black ink layer was prepared and calendered to a surface roughness of 1.5 microns (Parker surface roughness). They had an optical density in the range of 1.50-1.67.

Formulations C and D were prepared as described in Table 11.2 and brought to pH=8.5 with the addition of NaOH. The viscosities of the formulations were adjusted to 500 cps using RHOPLEX™ RM-232D.

TABLE 11.2

Preparation of top coat compositions including polymeric core/shell particles

| Formulation | Sample 9 | Sample 8 | RHOPLEX™ P-308 | Water |
|---|---|---|---|---|
| Solids | 25.2% | 25.2% | 50.0% | |
| C | 119.05 | | 20.00 | 55.40 |
| Ratio: | 0.75 | | 0.25 | |
| D | | 119.05 | 20.00 | 55.40 |
| Ratio: | | 0.75 | 0.25 | |

Formulations C and D were drawndown on the calendered black layers using a #18 WWR and dried at 50° C. for 3 minutes. The dry coat weight of the Formulations C and D was 8.5 g/m².

The optical densities of the films before (printer setting at 0) and after printing (printer setting at 5-25) are shown below. The recording material sheets were printed at a printing speed of 2 in/sec. at printer settings of from 0 to 25, higher values corresponding to higher temperatures of the thermal head. The results are presented in Table 11.3.

TABLE 11.3

| | Printing results | | | |
|---|---|---|---|---|
| Formulation | Sample 9/ Black A | Sample 9/ Black B | Sample 8/ Black A | Sample 8/ Black B |
| Printer setting | | | | |
| 0 | 0.16 | 0.15 | 0.18 | 0.16 |
| 5 | 0.31 | 0.28 | 0.33 | 0.28 |
| 10 | 0.49 | 0.42 | 0.56 | 0.52 |
| 15 | 0.81 | 0.58 | 1.00 | 0.79 |
| 20 | 1.02 | 0.80 | 1.32 | 1.02 |
| 25 | 1.23 | 0.99 | 1.30 | 1.07 |
| Brightness | 79.0 | 79.8 | 75.0 | 76.2 |

A base coat of Black Formulation A provides performance superior to that of Formulation B. For Black formulation A, significantly higher optical density of the printed area was observed at printing darkness>15.

We claim:

1. A recording material for thermal printing comprising:
   a) a support comprising at least one colored surfaces; and, disposed thereon,
   b) a layer comprising polymeric particles having a core/shell structure, said polymeric particles having an outer polymer shell having a calculated Tg of from 40° C. to 130° C., and comprising, when dry, at least one void capable of providing opacity to said layer;
   wherein said at least one colored surface has sufficient color density to be visibly contrasting to a surface of the layer comprising polymeric particles disposed thereon;
   wherein the polymeric particles have an outer diameter from 200 nm to 1500 nm, and an inner diameter of from 150 nm to 1000 nm;
   wherein the polymeric particles are structured to provide opacity to the layer when in core/shell form, and to provide transparency to the layer when collapsed;
   wherein the polymeric particles are structured to collapse in response to application of heat and pressure, thereby making the layer transparent in the area where heat and pressure are applied and providing an image; and
   wherein the recording material is substantially free of colorant precursors and developers.

2. The recording material for thermal printing of claim 1 wherein said support comprising at least one colored surface has a surface roughness of less than 3.0 microns.

3. The recording material for thermal printing of claim 2 wherein said support comprising at least one colored surface further has a porosity of less than 80 ml/min.

4. The recording material for thermal printing of claim 1, wherein the layer comprising the polymeric particles further comprises a polymeric binder.

5. The recording material for thermal printing of claim 4, wherein the polymeric binder is an emulsion polymer having a glass transition temperature of −25° C. to 35° C.

6. The recording material for thermal printing of claim 4, wherein the polymeric binder is an emulsion polymer having average particle diameter of 15 to 250 nm.

7. The recording material for thermal printing of claim 1 wherein the colorant precursor is a leuco dye and the developer is bisphenol A or bisphenol S.

8. The recording material for thermal printing of claim 1 wherein the outer polymer shell has a calculated Tg of from 40° C. to 80° C.

9. A recording material for thermal printing comprising:
   a) a support comprising at least one colored surface; and, disposed thereon, b) a layer comprising a permanent colorant and polymeric particles having a core/shell structure, said polymeric particles having an outer polymer shell having a calculated Tg of from 40° C. to 130° C., and comprising, when dry, at least one void capable of providing opacity to said layer, wherein said at least one colored surface has sufficient color density to be visibly contrasting to a surface of the layer comprising polymeric particles disposed thereon; and wherein said permanent colorant is a dye that has a visible color that is substantially invariant during an application or drying of the layer on the support, storage of the recording material, and formation of an image using said recording material with an agent selected from the group consisting of heat, pressure, and combinations thereof, wherein the polymeric particles have an outer diameter from 200 nm to 1500 nm, and an inner diameter of from 150 nm to 1000 nm;

wherein the polymeric particles are structured to provide opacity to the layer when in core/shell form, and to provide transparency to the layer when collapsed;

wherein the polymeric particles are structured to collapse in response to application of heat and pressure thereby making the layer transparent in the area where heat and pressure are applied and providing an image; and wherein the recording material is substantially free of colorant precursors and developers.

10. The recording material for thermal printing of claim 9 wherein the colorant precursor is a leuco dye and the developer is bisphenol A or bisphenol S.

11. A method for thermal printing comprising:
forming the recording material for thermal printing of any of claims 1-3, 9;
subjecting selected portions of said recording material to an agent selected from the group consisting of heat, pressure, and combinations thereof, sufficient to reduce the opacity of said selected portions.

12. A recording material for thermal printing comprising:
a) a support comprising at least one colored surface; and, disposed thereon,
b) a first layer comprising a permanent colorant and polymeric particles having a core/shell structure, said polymeric particles having an outer polymer shell having a calculated Tg of from 40° C. to 130° C., and comprising, when dry, at least one void capable of providing opacity to said first layer; and disposed thereon;
c) a second layer comprising polymeric particles having a core/shell structure, said polymeric particles having an outer polymer shell having a calculated Tg of from 40° C. to 130° C., and comprising, when dry, at least one void capable of providing opacity to said second layer, wherein said at least one colored surface has sufficient color density to be visibly contrasting to a surface of the layer comprising polymeric particles disposed thereon; and wherein said permanent colorant is a dye that has a visible color that is substantially invariant during an application or drying of the layer on the support, storage of the recording material, and formation of an image using said recording material with an agent selected from the group consisting of heat, pressure, and combinations thereof, wherein the polymeric particles have an outer diameter from 200 nm to 1500 nm, and an inner diameter of from 150 nm to 1000 nm;

wherein the polymeric particles are structured to provide opacity to the layer when in core/shell form, and to provide transparency to the layer when collapsed;

wherein the polymeric particles are structured to collapse in response to application of heat and pressure thereby making the layer transparent in the area where heat and pressure are applied and providing an image; and wherein the recording material is substantially free of colorant precursors and developers.

13. A recording material for thermal printing comprising:
a) a support comprising at least one colored surfaces; and, disposed thereon,
b) a layer comprising polymeric particles having a core/shell structure, said polymeric particles having an outer polymer shell having a calculated Tg of from 40° C. to 130° C., and comprising, when dry, at least one void capable of providing opacity to said layer;

wherein inorganic pigments are excluded from said layer comprising polymeric particles;

wherein said at least one colored surface has sufficient color density to be visibly contrasting to a surface of the layer comprising polymeric particles disposed thereon;

wherein the polymeric particles have an outer diameter from 200 nm to 1500 nm, and an inner diameter of from 150 nm to 1000 nm;

wherein the polymeric particles are structured to provide opacity to the layer when in core/shell form, and to provide transparency to the layer when collapsed;

wherein the polymeric particles are structured to collapse in response to application of heat and pressure, thereby making the layer transparent in the area where heat and pressure are applied and providing an image; and wherein the recording material is substantially free of colorant precursors and developers.

* * * * *